(12) United States Patent
Mori et al.

(10) Patent No.: US 8,290,066 B2
(45) Date of Patent: Oct. 16, 2012

(54) SIGNAL TRANSMISSION CIRCUIT

(75) Inventors: Hiroyuki Mori, Anjo (JP); Norio Sanma, Okazaki (JP); Yoshihiko Ozeki, Okazaki (JP); Kazuyoshi Nagase, Kitanagoya (JP)

(73) Assignees: Nippon Soken, Inc., Nisho (JP); DENSO CORPORATION, Kariya (JP)

( * ) Notice: Subject to any disclaimer, the term of this patent is extended or adjusted under 35 U.S.C. 154(b) by 735 days.

(21) Appl. No.: 12/453,323

(22) Filed: May 7, 2009

(65) Prior Publication Data
US 2009/0279617 A1  Nov. 12, 2009

(30) Foreign Application Priority Data

May 8, 2008 (JP) .................. 2008-122189
Jan. 30, 2009 (JP) .................. 2009-19706

(51) Int. Cl.
*H04B 3/00* (2006.01)
(52) U.S. Cl. ....................................... 375/257
(58) Field of Classification Search ............ 375/257
See application file for complete search history.

(56) References Cited

U.S. PATENT DOCUMENTS 5,896,417 A    4/1999 Lau
6,487,250 B1 * 11/2002 Kato et al. .................. 375/257
2008/0063090 A1 *  3/2008 Smiley ........................ 375/257
2008/0211599 A1 *  9/2008 Elend .......................... 333/32
2009/0268646 A1 * 10/2009 Kwan et al. ................. 370/286

FOREIGN PATENT DOCUMENTS

| JP | A-07-107020  | 4/1995  |
| JP | A-08-331002  | 12/1996 |
| JP | A-2007-81821 | 3/2007  |
| JP | A-2008-178058| 7/2008  |

OTHER PUBLICATIONS

Office Action (and English translation) dated Jul. 5, 2010 in corresponding German application No. 10 2009 019 440.1.

* cited by examiner

*Primary Examiner* — Kevin M Burd
(74) *Attorney, Agent, or Firm* — Posz Law Group, PLC

(57) ABSTRACT

A signal transmission circuit is capable of reducing distortion that occurs during signal transmission. A digital output signal is transmitted from a terminal to a signal line via an output buffer circuit and an output impedance unit. The terminal is connected to an impedance variation unit via an impedance control unit. The impedance variation unit designates an impedance for terminating the signal line when the output data is changed from a high level H to a low level. A reflection occurring on the signal line can be prevented and a waveform distortion can be suppressed.

26 Claims, 13 Drawing Sheets

PROPAGATION DELAY: 5.0ns/m
CHARACTERISTIC IMPEDANCE: 100Ω

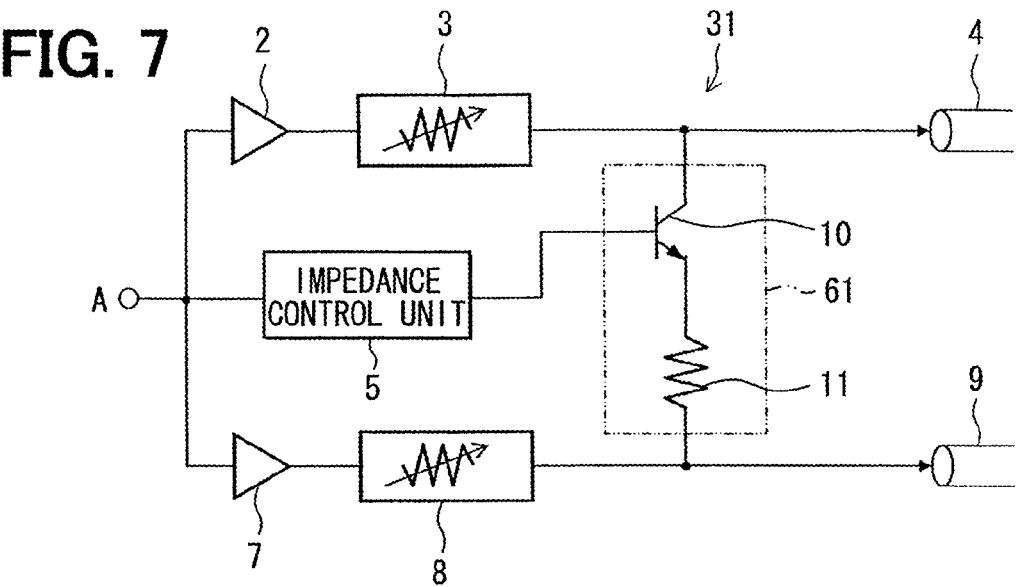
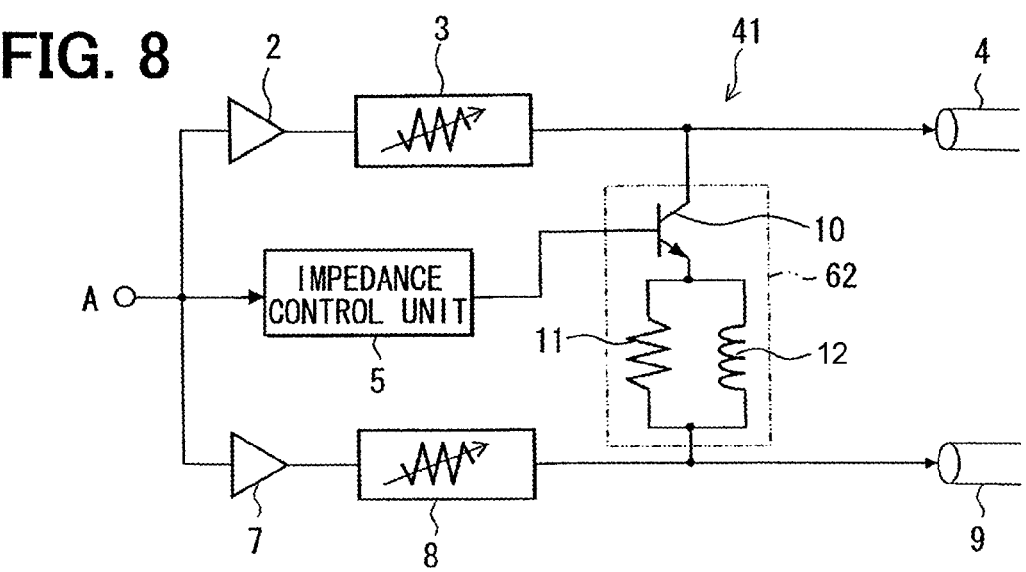
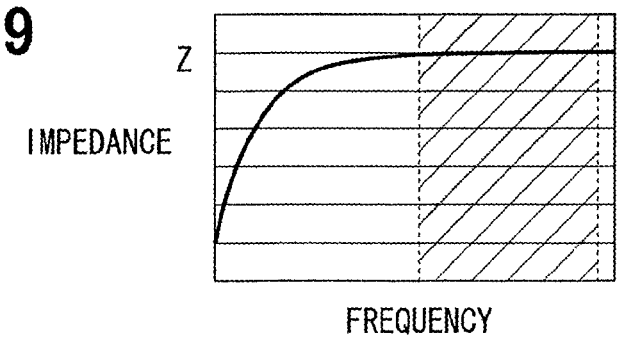

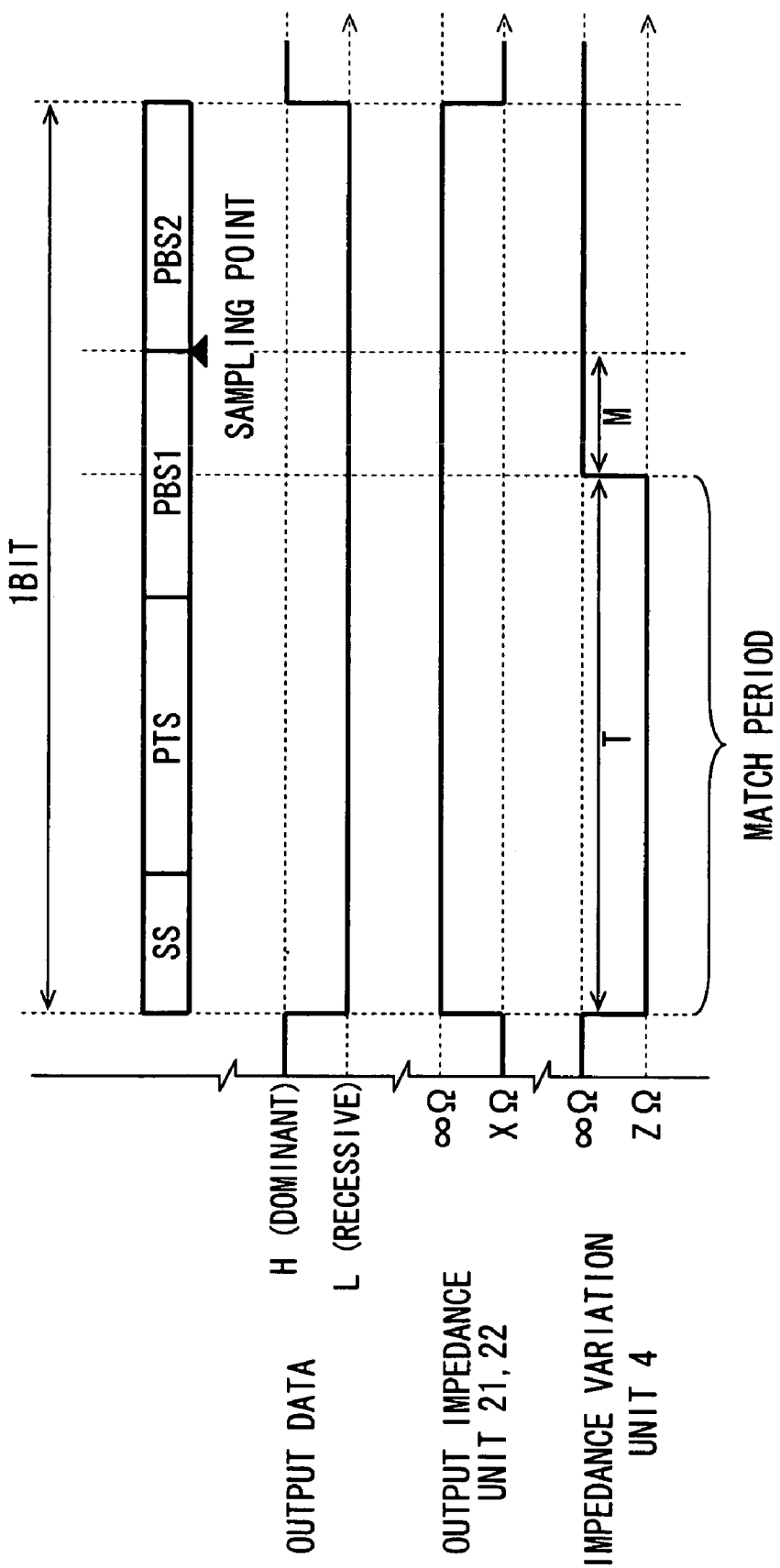

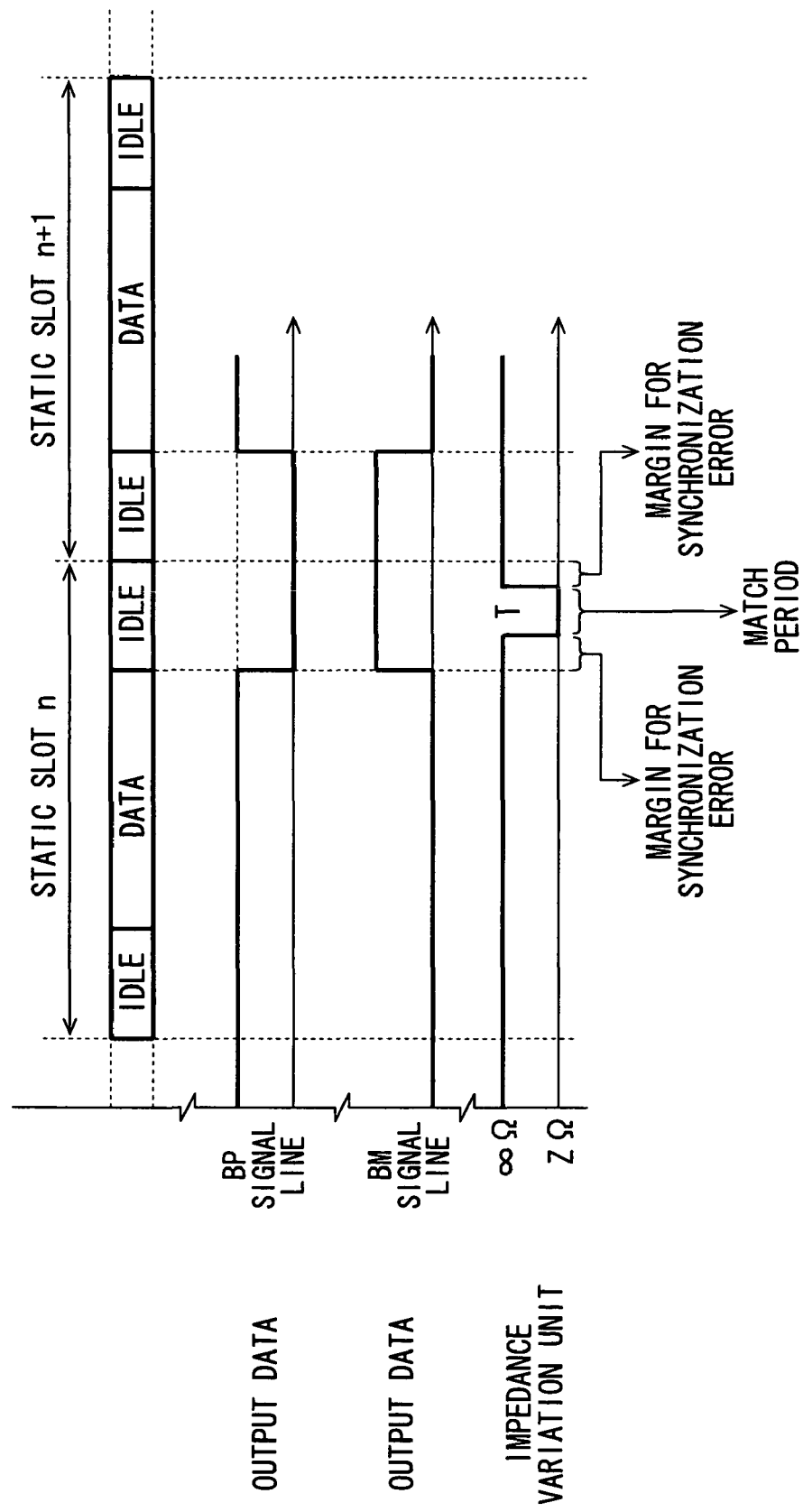

| | INPUT | INSIDE | | | | OUTPUT | IMPEDANCE | | |
|---|---|---|---|---|---|---|---|---|---|
| | C0 | P1 | P2 | P3 | P4 | C2 | C2 | C1 | C3 |
| STATE 1 | H | H | L | L | H | L | ∞ | X | Y |
| STATE 2 | L | H | H | H→L | L→H | H→L | Z→∞ | ∞ | ∞ |

(a) OUTPUT DATA (b) FIRST OUTPUT IMPEDANCE UNIT (c) SECOND OUTPUT IMPEDANCE UNIT (d) IMPEDANCE VARIATION UNIT (e) TERMINAL P2

(f) TERMINAL P3

SIGNAL TRANSMISSION CIRCUIT

CROSS REFERENCE TO RELATED APPLICATIONS

The present application is based on and claims priority to Japanese Patent Application JP 2008-122189, filed on May 8, 2008 and Japanese Patent Application JP 2009-019706, filed on Jan. 30, 2009, the contents of both of which are incorporated herein by reference.

BACKGROUND OF THE INVENTION

1. Field of the Invention

The present invention relates to a signal transmission circuit and, more particularly, to a circuit controlling an impedance for transmission of a signal on a transmission line.

2. Description of the Related Art

In connection with a signal transmission circuit in a bidirectional transmission line, deterioration of a transmission characteristic can be prevented if one of the transmitting or receiving devices enters a transmitting state, the other transmitting receiving device is set to a receiving state. Reference can be made, for example, to JP-A-07-107020.

To be more specific, in a constitution in which a pair of transmitting/receiving devices is connected to both terminals of a transmission line, a switch and a terminating resistor are interposed between each of the terminals of the transmission line and a terminating voltage source. If each of the transmitting/receiving devices enters a transmitting state, the switch is turned off. If each of the transmitting/receiving devices enters a receiving state, the switch is turned on. Thus, far-end termination can be realized, and a waveform distortion can be reduced.

The foregoing conventional signal transmission circuit presupposes that the number of transmitting/receiving devices that enter the transmitting state for one-to-one communication is always one. After the transmitting/receiving device that enters the transmitting state is identified, a transmitting/receiving device that enters the receiving state is terminated. Therefore, as for a large-scale network or a multimaster network, if transmitting/receiving devices that enter the transmitting or receiving state are uncertain, the conventional signal transmission circuit cannot be adopted. Assuming that an impedance mismatch point exists in a transmission line and a reflected wave is generated, the waveform distortion is increased because of the mismatch in the impedances at the transmitting end. Further, if multiple transmitting/receiving devices enter the receiving state, multiple terminating resistors are validated. A synthetic value of impedances decreases, and a signal voltage of a high level H decreases.

SUMMARY OF THE INVENTION

The present invention addresses the foregoing situation, and is intended to provide a signal transmission circuit capable of reducing a communicative waveform distortion occurring during signal transmission.

According to a signal transmission circuit set forth herein in accordance with a first aspect, when a digital output signal is input to an output buffer, the output buffer retains a state associated with the output data value, and an output impedance unit changes an impedance on a side connected to a signal line. When the output data value transitions to a high level, the output impedance unit sets the impedance to a predetermined impedance. When the output data transitions to a low level, the impedance is set to a high impedance. When an impedance control unit detects the fact that the output data value has been changed from the high level H to the low level, the impedance control unit controls the impedance of an impedance variation unit so that the impedance will have a value close to the characteristic impedance of the signal line during only a predetermined period. Even if a signal outputted to the signal line is reflected and returned, the signal can be terminated without being reflected again. Therefore, a communicative waveform distortion occurring during signal transmission can be reduced.

According to a signal transmission circuit set forth herein in accordance with another aspect, even when first and second signal lines exist, if a digital output signal is input to first and second output buffers, the first and second output buffers retain a state associated with the output data value. First and second output impedance units change impedances on sides thereof connected to the first and second signal lines respectively. When the output data value transitions to a high level, the impedances are set to a predetermined impedance. When the output data transitions to a low level, the impedances are set to a high impedance. When an impedance control unit detects the fact that the output data value has been changed from the high level H to the low level, the impedance control unit controls the impedance of an impedance variation unit so that the impedance will have a value close to a differential impedance between the first and second signal lines during only a predetermined period. Therefore, even when a signal outputted to a signal line is reflected and returned, the signal will not be reflected again but can be terminated. Eventually, a communicative waveform distortion occurring during signal transmission can be reduced.

According to a signal transmission circuit set forth herein in accordance with another aspect, the impedance variation unit includes a switching element and an impedance element that presents a predetermined impedance and can be connected through the switching element. For controlling the impedance variation unit, the impedance control unit controls the ON and OFF states of the switching element.

According to a signal transmission circuit set forth in accordance with another aspect, the impedance variation unit includes a transistor and an impedance element connected in series with the transistor that provides a predetermined impedance. For controlling the impedance variation unit, the impedance control unit controls the ON and OFF states of the transistor, which can be, for example, a bipolar transistor, a field-effect transistor (FET), or the like.

According to a signal transmission line set forth in accordance with another aspect, the impedance element of the impedance variation unit may be realized with a resistive element. Accordingly, a signal line can be readily terminated with the impedance provided by the resistive element.

According to a signal transmission circuit set forth in accordance with another aspect, the impedance element of the impedance variation unit may be realized with a filter circuit having the property of evening a dominant frequency band in which a waveform distortion occurs in a signal to be transmitted over a signal line. An adverse effect of reflection on the signal line or the waveform distortion can be effectively prevented by selectively terminating a signal component that falls within the frequency band and likely to cause the waveform distortion.

According to a signal transmission circuit set forth in accordance with another aspect, when a digital output signal conforms to a controller area network (CAN) protocol, a period extending from a transition time of the output data value of the digital output signal from a high level H to a low level, to a time preceding a sampling point and at which a time required for ensuring a voltage needed for sampling of data is preserved, is designated as the predetermined period during which the impedance control unit controls the impedance of the impedance variation unit so that the impedance will have a value close to the characteristic impedance of a signal line or the differential impedance between the first and second signal lines. Therefore, even when the signal transmission circuit is used under the CAN protocol, signal transmission can be achieved in such a manner that a waveform distortion will be reliably reduced without an adverse effect on sampling.

According to a signal transmission circuit set forth in accordance with another aspect, when a digital output signal conforms to the FlexRay protocol, a period obtained by subtracting a synchronization error from an idle period within a static slot for the digital output signal is designated as the predetermined period during which the impedance control unit controls the impedance of the impedance variation unit so that the impedance will have a value close to the characteristic impedance of a signal line or the differential impedance between the first and second signal lines. Therefore, even when the signal transmission circuit is used under the FlexRay protocol, as long as the idle period is utilized, signal transmission can be achieved without occurrence of an adverse effect during a data transmission period.

According to a signal transmission circuit set forth in accordance with another aspect, when multiple impedance mismatch points exist in a path of a signal line, a period extending from a transition time, that is, when a data value of an output signal is changed from a high level H to a low level L is detected, to a time when a reflected wave is returned from a principal one, such as a nearest one of the multiple impedance mismatch points, is designated as the predetermined period during which the impedance control unit controls the impedance of the impedance variation unit so that the impedance will have a value close to the characteristic impedance of the signal line. Therefore, an adverse effect of a reflected wave coming from a principal reflecting point such as a branch point or a node located at a position near the signal line path can be suppressed, and reliable communication can be achieved.

According to a signal transmission circuit set forth in accordance with another aspect, a complementary metal-oxide semiconductor (CMOS) circuit is adopted as a component of the circuit. Therefore, a constitution that operates with low power consumption can be realized.

According to a signal transmission circuit set forth in accordance with another aspect, the components of the circuit are integrated and formed in a one-chip semiconductor substrate. Therefore, a simple constitution in which an IC formed in the one-chip semiconductor substrate is interposed between an output unit for a digital output signal and a signal line can be realized.

According to a signal transmission circuit set forth in accordance with another aspect, a silicon-on-insulator (SOI) substrate is adopted as the semiconductor substrate. Therefore, a leakage current that flows through each of elements constituting the circuit or an interaction among the elements can be reliably suppressed.

According to a signal transmission circuit set forth in accordance with another aspect, the components constituting the circuit are formed as a complex IC in which a bipolar transistor, a power MOS transistor, a CMOS circuit, a resistor, a capacitor, and a memory element coexist. Therefore, a constitution including circuit elements suitable for the property of the circuit can be realized. Since the SOI substrate is adopted, isolation among elements can be reliably achieved.

BRIEF DESCRIPTION OF THE DRAWINGS

Other objects, features and characteristics of the present invention will be appreciated and become apparent to those of ordinary skill in the art and all of which form a part of the present application. In the drawings:

FIG. 7 is a block diagram illustrating an exemplary electrical configuration in accordance with a third embodiment;

FIG. 8 is a block diagram illustrating an exemplary electrical configuration in accordance with a fourth embodiment;

FIG. 9 is a graph illustrating an exemplary frequency characteristic based on an impedance of an exemplary impedance variation unit;

FIG. 10 is a timing chart illustrating exemplary timing of signals for controlling states of components in accordance with a fifth embodiment;

FIG. 11 is a timing chart illustrating exemplary timing of signals for controlling states of components in accordance with a sixth embodiment;

DETAILED DESCRIPTION OF THE EXEMPLARY EMBODIMENTS

First Embodiment

Figure 1:
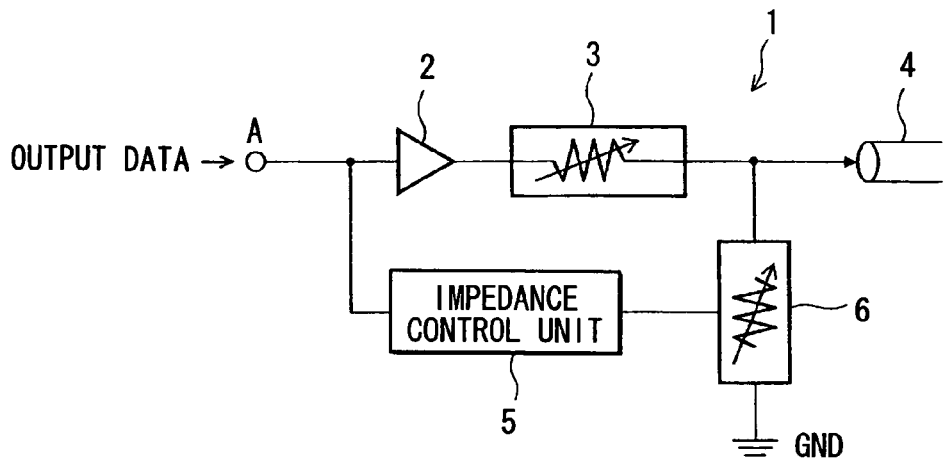
FIG. 1 is a block diagram illustrating an exemplary electrical configuration in accordance with a first embodiment.
Figure 2:
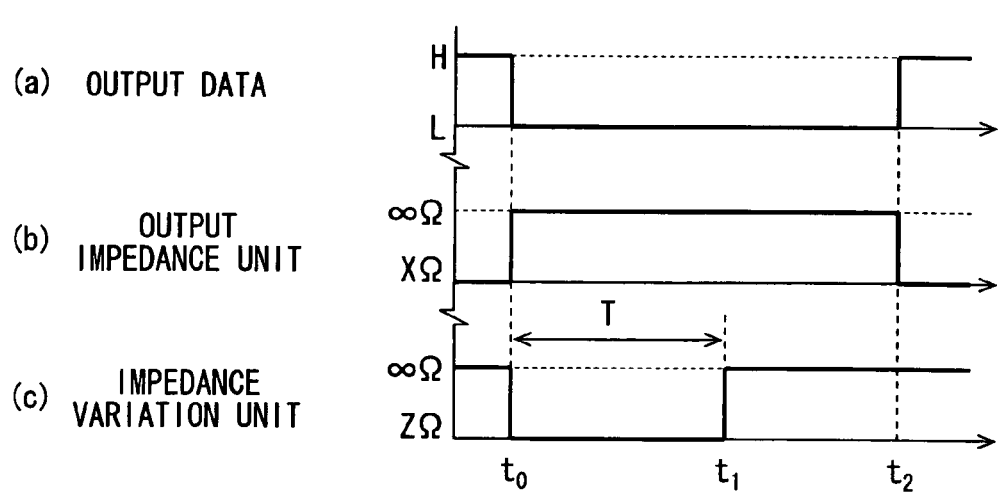
FIG. 2 is a timing chart illustrating exemplary timing of signals for controlling states of components.

Referring to FIG. 1 and FIG. 2, a first embodiment will be described below.

FIG. 1 shows a signal transmission circuit 1 of the present embodiment. A digital output signal transmitted as data from a signal output circuit (not shown) is applied to a terminal A. The terminal A is connected to an input terminal of an output buffer circuit 2. An output terminal of the output buffer circuit 2 is connected to a signal line 4 via an output impedance unit 3.

The output impedance unit 3 can be configured such that when a signal input from the output buffer circuit 2 transitions to a high level H, the output impedance unit 3 will set an impedance for the signal line 4 to a predetermined impedance XΩ. When the signal transitions to a low level L, the output impedance unit 3 will set the impedance for the signal line 4 to a high impedance. For example, the output impedance unit 3 enters the equivalent of an open state, presenting an infinite impedance ∞Ω to the signal line 4.

The terminal A is also connected to an impedance control unit 5. An impedance variation unit 6 is connected between the signal line 4 and a ground terminal GND. The impedance value with which the signal line 4 is terminated is generated by impedance variation unit 6 under the control of the impedance control unit 5. The impedance variation unit 6 is controlled such that the impedance is varied according to the value of output data that is input to the terminal A. The impedance variation unit 6 is configured such that the impedance thereof will change, for example, between two levels. Namely, the impedance variation unit 6 enters a high impedance ∞Ω state and a low impedance ZΩ state. In the low impedance ZΩ state, the impedance is set to, for example, the characteristic impedance of the signal line 4.

Next, an operation will be described with reference to FIG. 2.

In FIG. 2, timing diagram (a) shows a temporal transition of the output data that is input to the terminal A. As illustrated, the output data signal changes from a high level H to a low level L at a time t0 and changes again to the high level H from the low level L at a time t2. When the output data is at the high level H, the output buffer circuit 2 outputs, for example, a voltage of 2 V. When the output data is at the low level L, output buffer circuit 2 outputs, for example, a voltage of 0 V.

In contrast, timing diagram (b) in FIG. 2 shows the change in the state of an impedance of the output impedance unit 3. When the output data is at the high level H, the impedance of the output impedance unit 3 is set to a low impedance XΩ. When the output data changes to the low level L, the impedance of the output impedance unit 3 transitions to a high impedance ∞Ω. Thus, a voltage signal associated with the output data is easily outputted to the signal line 4.

When the impedance of the output impedance unit 3 changes according to the level of the digital output signal, the impedance control unit 5 controls the terminal impedance of the signal line 4. When the level of the digital output signal is changed from the high level H to the low level L, the impedance control unit 5 provide control such that the impedance variation unit 6, from in the high impedance ∞Ω state, will, as shown in timing diagram (c) in FIG. 2, present a low impedance ZΩ only for a certain time, such as during time T.

At the time t0, the output data is changed from the high level H to the low level L and the impedance of the impedance variation unit 6 is controlled or set to the low impedance ZΩ, which is the characteristic impedance of the signal line 4. At such a time, even when a signal is inputted over the signal line 4, the reflection of the signal can be suppressed and occurrence of a distortion in the signal level can be prevented.

The impedance variation unit 6 is controlled so as to be shifted from the low impedance state in which the low impedance is presented, to the high impedance state at the time t1 after a certain time T, which can be referred to as an impedance match period, has elapsed. At time t1, the output data remains at the low level L. Thereafter, when the output data changes to the high level H, the impedance of the output impedance unit 3 is also changed to the low impedance.

As a result, the impedance is set to the characteristic impedance ZΩ of the signal line 4 for only the certain time T, that is, a time from the time t0 to the time t1, after the output data is changed from the high level H to the low level. Therefore, an impedance match is attained only at a transmitting end during a certain period during which the output data falls. Even when multiple transmitting/receiving devices are connected onto the signal line 4 or an impedance mismatch is present in the signal line 4, a waveform distortion in output data can be reduced.

In the present embodiment, the period T during which an impedance is matched with the characteristic impedance of the signal line by the impedance control unit 5 and impedance variation unit 6 is not limited to a particular time, but may be set to an appropriate time based on various transmission rates, transmit protocols, and the like.

Second Embodiment

Referring to FIG. 3 to FIG. 6, a second embodiment is described below. A second embodiment differs from a first embodiment in that, for example, a signal transmission circuit 21 includes two signal lines. The difference from a first embodiment will be described below.

Figure 3:
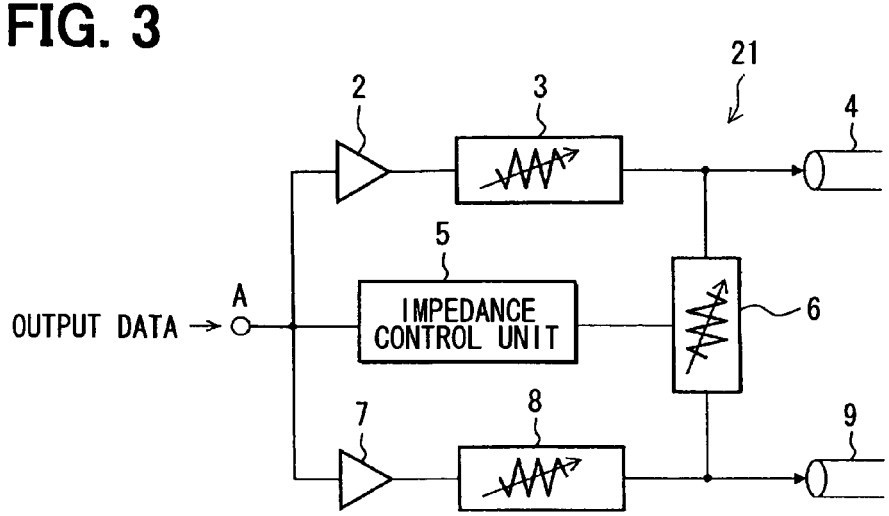
FIG. 3 is a block diagram illustrating an exemplary electrical configuration in accordance with a second embodiment.

FIG. 3 shows the circuitry of the signal transmission circuit 21. In addition to the output buffer circuit 2 and output impedance unit 3 included in a first embodiment, an output buffer circuit 7 and an output impedance unit 8 that are identical to the output buffer circuit 2 and output impedance unit 3 respectively are included. In addition to the signal line 4, a signal line 9 is included. The impedance control unit 5 and impedance variation unit 6 are included as they are. The impedance variation unit 6 can vary the terminal impedances in the signal lines 4 and 9.

The output buffer circuit 2 is equivalent to a first output buffer. The output buffer circuit 2 is configured so that when a signal of a high level H is input to terminal A, the output buffer circuit 2 will output a signal of, for example, +2 V. When a signal of a low level L is input to terminal A, the output buffer circuit 2 will output 0 V. The output buffer circuit 7 is equivalent to a second output buffer, and configured so that when the output data transitions to the high level H, the output buffer circuit 7 will output −2 V. When the output data transitions to the low level L, the output buffer circuit 7 will output 0 V.

The output impedance units 3 and 8 are equivalent to first and second output impedance units respectively. When the output data transitions to the high level, the output impedance units 3 and 8 enter the low-impedance state. When the output data transitions to the low level, the output impedance units 3 and 8 enter the high-impedance state. In the low-impedance state, the impedances of the output impedance units 3 and 8 are set to the XΩ and YΩ values respectively.

Further, when the output data transitions to the low level L, the impedance of the impedance variation unit 6 is switched from the high impedance to a predetermined impedance by the impedance control unit 5. The predetermined impedance is set to a value ZΩ close to the differential impedance between the signal lines 4 and 9.

Figure 4:
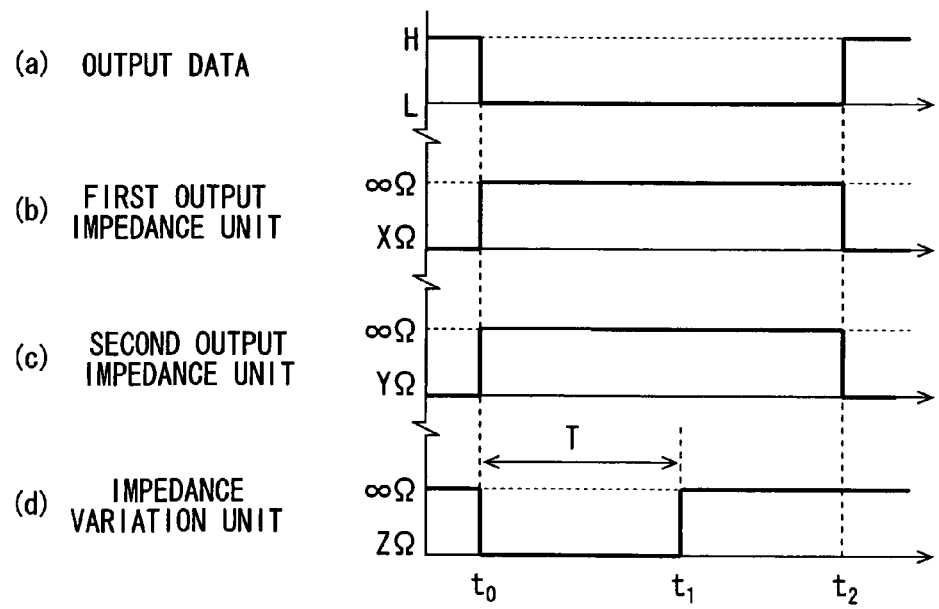
FIG. 4 is a timing chart illustrating exemplary timing of signals for controlling states of components.

In the foregoing constitution, when the output data is, as shown in (a) of FIG. 4, changed from the high level H to the low level, the impedances of the output impedance units 3 and 8 become, as shown in timing diagram (b) and timing diagram (c) of FIG. 4, the high impedance. At such a time, when the output impedance units 3 and 8 are changed to the high-impedance state, the impedance variation unit 6 is switched from the high-impedance state to the low-impedance state by the impedance control unit 5 so that the impedance variation unit 6 will stay in the low-impedance state during the certain period T. The impedance of the impedance variation unit 6 is set to the differential impedance ZΩ.

An impedance match is attained only at the transmitting end during the certain period T, that is, an impedance match period after the fall of the output data. Even when multiple transmitting/receiving devices are connected onto the signal lines 4 and 9 or an impedance mismatch is present in the signal lines 4 and 9, a waveform distortion in the output data can be reduced.

In the foregoing embodiment, the impedance variation unit 6 should preferably set the impedance match period T to the longest possible period within a period during which the output data transitions to the low level. However, the impedance match period T should be set to an appropriate time in consideration of, for example, the timing at which the output data transitions to the high level H, or the reliable reception of data.

Figure 5:
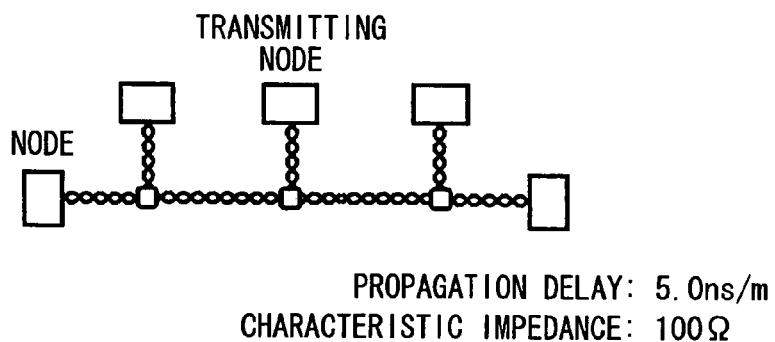
FIG. 5 is a diagram illustrating a connected state of a simulation model including exemplary nodes connected to a signal line.
Figure 6:
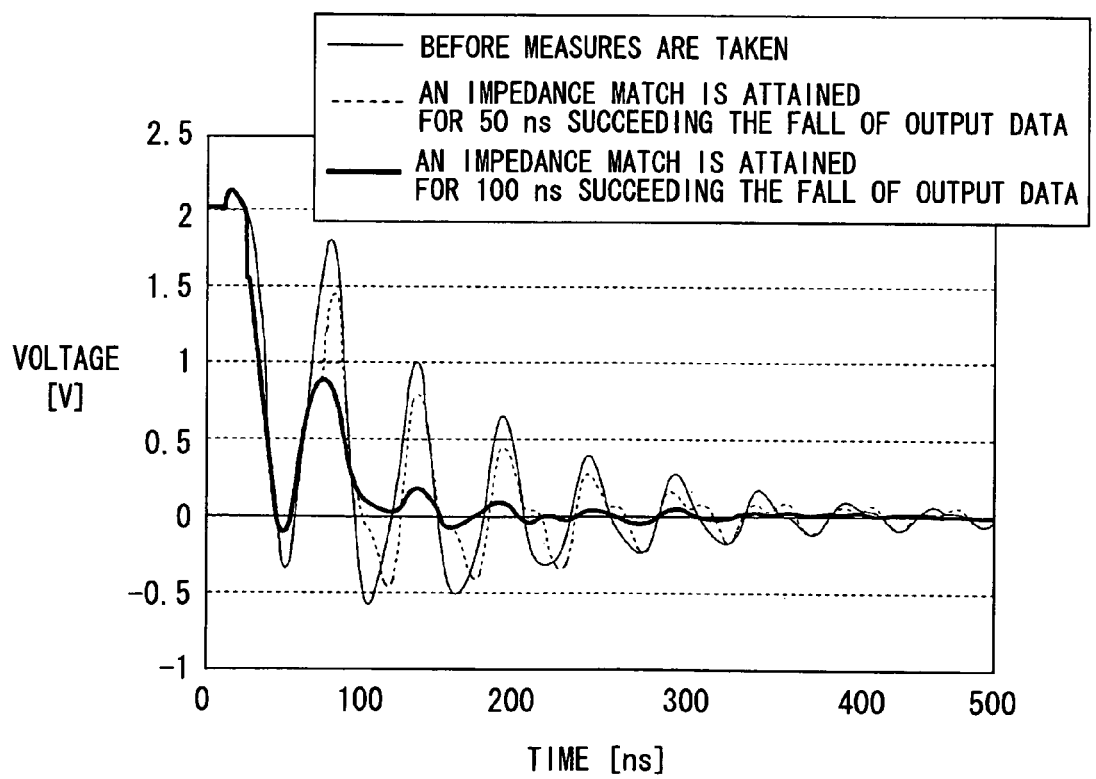
FIG. 6 is a graph illustrating exemplary simulation results.

FIG. 5 is a diagram of a model network having nodes connected by a signal line, and FIG. 6 show the results of simulation of the correlation between a time designated as the impedance match period T and a waveform distortion derived from reflection occurring at a transmitting end of a signal line. FIG. 5 shows a model of a state in which a circuit used for simulation is connected on a network. The model has two transmitting/receiving devices connected at the terminal parts of the signal line, and has a transmitting/receiving device, which transmits or receives output data, connected to a node in the center of the network. Herein, a state in which the center node transmits and receives data is simulated.

When simulation is performed under the above conditions, the results shown in FIG. 6 are obtained. Specifically, a temporal change in a voltage of a signal received by the transmitting/receiving device at the center node exhibits the largest variation before measures are taken. FIG. 6 demonstrates that once the impedance match period T is extended from 50 ns to 100 ns, a time required for decay of a vibration gets shorter. Namely, as the impedance match period T gets longer, reflection of a signal on a signal line decreases. A state in which a voltage fluctuation is limited can be attained.

The results of the simulation demonstrate that when the impedance match period T is set to, for example, 100 ns, the waveform distortion is minimized. However, in reality, there is an upper limit of values, to which the impedance match period T can be set, because of such a restriction as a repetition frequency of output data. Appropriate setting of the impedance match period T depends on the topology of a network.

As seen from the results of the simulation, when the impedance variation unit 6 controls the terminal impedance so that the terminal impedance will be equal to the differential impedance during a period during which the predetermined impedance match period T elapses since the timing at which the output data is driven to the low level, a signal distortion can be reduced. The impedance match period T should preferably be set to the longest possible time while being restricted in terms of signal transmission.

Third Embodiment

Referring to FIG. 7, a third embodiment is described below. Herein, a signal transmission circuit 31 includes a concrete example of the impedance variation unit 6 that has been described in relation to a second embodiment. In the present embodiment, the signal transmission circuit 31 is provided with an impedance variation unit 61 including a series circuit composed of an npn bipolar transistor 10 and a resistor 11 presenting an impedance. The resistance of the resistor 11 is set to a value equivalent to the differential impedance between the signal lines 4 and 9. A control signal for controlling the ON and OFF states is input from the impedance control unit 5 to the transistor 10. When the transistor 10 is in the ON state, the resistor 11 terminates the signal lines 4 and 9.

According to a third embodiment, the same operation and advantage as those of a second embodiment can be provided. In addition, the impedance variation unit 61 can be realized with simple components. The impedance control unit 5 should be designed to merely turn ON or OFF the transistor 10.

Fourth Embodiment

Referring to FIG. 8 and FIG. 9, a fourth embodiment is described below. Similarly to a third embodiment, a signal transmission circuit 41 includes a concrete example of the impedance variation unit 6 that has been described in relation to a second embodiment. In the present embodiment, the signal transmission circuit 41 includes the impedance variation unit 62 having a resistor 11 and a coil 12 connected in parallel with each other as an impedance circuit connected in series with an npn transistor 10 and forming a filter.

In relation to a domain of low frequencies, the impedance of the impedance circuit composed of the resistor 11 and coil 12 is small because the impedance of the coil 12 is small. As the frequency gets higher, the impedance of the coil 12 gets larger. As a result, the impedance value Z increases to approach the impedance of the resistor 11. The higher frequencies at which the impedance value Z is presented are matched with a dominant frequency region in which a waveform distortion occurs in the signal lines 4 and 9.

According to a fourth embodiment, the impedance variation unit 62 can be realized with simple components. The impedance value Z suitable for the dominant frequency band in which a waveform distortion appears can be determined. Effective impedance matching can be achieved by reducing a loss.

Fifth Embodiment

Referring to FIG. 10, a fifth embodiment is described below. In the present embodiment, an object to which the second, third, or fourth embodiment is adapted is a transmission system adopting the controller area network (CAN) protocol. In the present embodiment, the impedance match period T can be effectively determined.

In accordance with the CAN protocol, a cycle during which one-bit data is transmitted includes four segments, that is, a synchronization segment (SS), a propagation time segment (PTS), a phase buffer segment 1 (PBS1), and a phase buffer segment 2 (PBS2).

Under the CAN protocol, a collision arbitration facility is requested to normally operate. The impedance match period T has to be determined in consideration that the operation of the collision arbitration facility may be adversely affected.

Under the CAN protocol, the leading edge of output data from a low level L, or a recessive level, to a high level H, or a dominant level, is used for inter-node synchronizing processing and so the leading edge has to be accurately identified.

When a previous bit transitions to the low level L, if the impedance of a transceiver associated with a subject node is adjusted in relation to the next bit, there is a fear that the leading edge of the bit may not be accurately identified. Therefore, in accordance with various exemplary embodiments, an impedance match is attained during a period such as, for example, the predetermined impedance match period T, during which the output data falls from the high level H to the low level L. During the period T, even when a signal of the high level H is outputted from any other node, the signal of the high level H associated with the subject node is simply succeeded by the signal of the high level H from another node. Since in the above described scenario, a leading edge does not occur, the synchronizing processing is not adversely affected.

Identification of a bit taking on the high level H or low level L is performed based on a voltage level at a sampling point. When multiple transceivers, each of which adjusts an impedance, are accommodated in a network, the impedance of the entire network decreases. Even when a signal of the high level H, that is, the dominant level, is outputted from any other node, there is a possibility that a necessary potential may not be preserved until the sampling point.

The impedance match period T can therefore be terminated earlier in accordance with a margin M, which can be referred to as a distortion convergence time, a rise time, or a time covering an error among nodes, whereby the impedance of the network is restored to a normal state. Thus, bit identification is achieved normally. When the impedance match period T is determined as mentioned above, a re-synchronizing processing facility and the collision arbitration facility are allowed to operate normally.

Sixth Embodiment

Referring to FIG. 11, a sixth embodiment is described below. In the present embodiment, an object to which the second, third, or fourth embodiment is adapted is a transmission system adopting the FlexRay™ protocol. In the present embodiment, the appropriate length of the impedance match period T can be effectively determined.

The FlexRay™ protocol is one kind of time-division multiplexing protocol. Particularly during a static slot, communication has to be terminated within an allocated time interval. As shown in FIG. 11, the static slot has an idle period defined to succeed a data period so that an inter-node error can be corrected during the idle period.

If a large waveform distortion occurs after data transmission, a time at which an idle period is identified is delayed. A time interval of a static slot is therefore recognized as having elapsed, and an error occurs. A match is attained during the idle period succeeding data transmission in order to prevent occurrence of an error.

It is possible that the length of the idle period may vary due to synchronization errors among nodes, and a possibility that the idle period at a certain node may be preceded or succeeded by a data transmission period at any other node. Therefore, the impedance match period T is set to a period determined in consideration of the errors.

Seventh Embodiment

Figure 12:
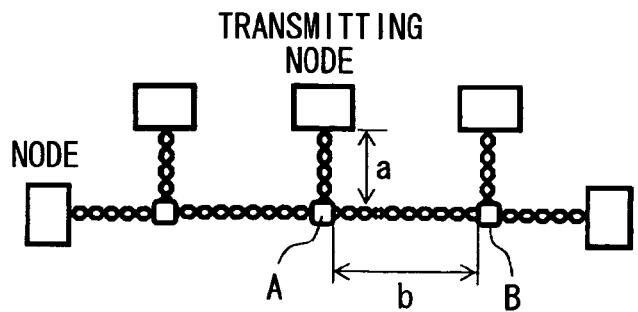
FIG. 12 is a timing chart illustrating exemplary timing of signals for controlling states of components in accordance with a seventh embodiment.
Figure 13:
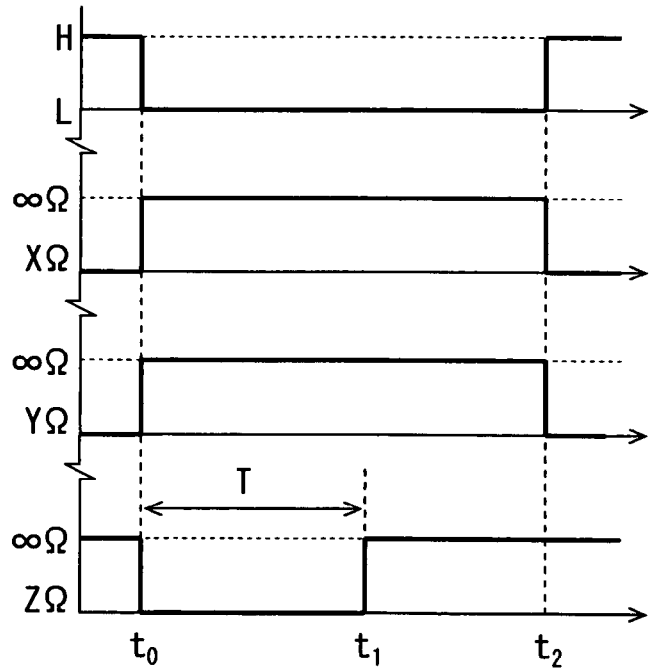
FIG. 13 is a timing chart illustrating exemplary timing of signals for controlling states of components.

Referring to FIG. 12 and FIG. 13, a seventh embodiment is described below. In accordance with a seventh embodiment, the time required as the impedance match period T determined, in a second embodiment, based on the results of simulation, is determined under more concrete conditions.

FIG. 12 is a diagram showing the network topology of FIG. 5. A transmitting node and other multiple nodes are connected to a signal line. The signal line is branched out to form paths leading to the nodes. In the illustrated topology, a branch point A located close to the transmitting node shall be separated by a distance "a" from the transmitting node, and shall be separated by a distance "b" from an adjoining branch point B. In the example, the propagation time is assumed to be 5 ns/m with a characteristic impedance of 100 ohms. In the above described topology, an impedance mismatch can occur at the positions of the branch points A and B. The branch points may exert an adverse effect on the transmitting node as principal reflecting points. When a time required for propagation of reflected waves from the principal reflecting points or nodes is, as shown in FIG. 13, designated as the impedance match period T, a distortion suppression effect can be improved.

More specifically, for example, assuming that the distance "a" is 1 m and the distance "b" is 3 m, if the impedance at the branch point A, the first branch point from the transmitting node, is equal to the impedances at the other branches, a reflected version of the signal having a magnitude of approximately one-third of a transmitted signal is negatively reflected and returned to the transmitting node in a reciprocating time of 10 ns calculated as 1 m×2 (round trip)×5 ns/m. In other words, after a signal is transmitted from the transmitting node, as long as 10 ns or more is designated as the impedance match period T, an effect of suppressing a distortion derived from reflection from the branch point A can be improved.

If a reflected wave from the second branch point B adversely affects transmission from the transmitting node, a reflected version of the signal having a magnitude of approximately one-third of a signal branched out at the branch point A and propagated to the transmitting node is reflected as mentioned above. The reciprocating time is calculated as 40 ns=(1 m+3 m)×2 (round trip)×5 ns/m. A time equal to or longer than 40 ns is designated as the impedance match period T, and a distortion suppressing effect can be achieved. Herein, the branch points A and B are taken into consideration. If a reflected wave from a farther branch point or a node is likely to exert an adverse effect, the branch point or node is also considered as a principal reflecting point. Therefore, the impedance match period T can be calculated and determined in the same manner as it is described previously.

A period required for propagation of a reflected wave from the principal reflecting point is designated as the impedance match period T. The period is a minimum necessary period for preventing incorrect identification of a bit. The impedance match period T can be set to a longer period in order to improve the distortion suppressing effect.

Eighth Embodiment

Figure 14:
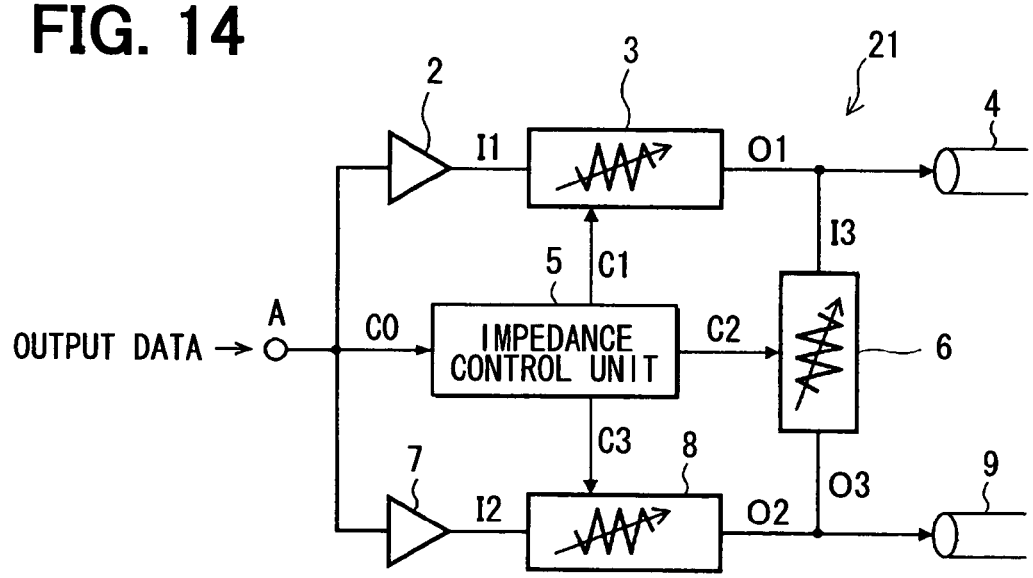
FIG. 14 is a block diagram illustrating an exemplary electrical configuration in accordance with an eighth embodiment.
Figure 17:
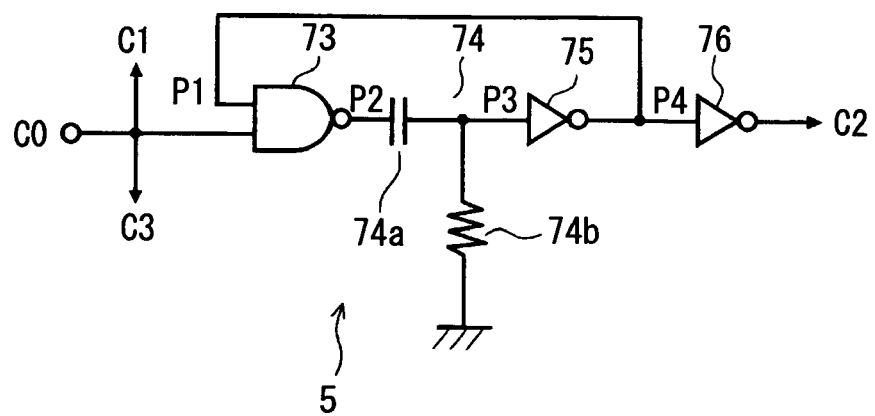
FIG. 17 is a diagram illustrating an equivalent circuit of an exemplary impedance control unit.

Referring to FIG. 14 and FIG. 17, an eighth embodiment is described below. An eighth embodiment differs from a second embodiment in that, for example, a CMOS circuit is substituted for the bipolar transistor 10. FIG. 14 shows a configuration similar to the one shown in FIG. 3. Output data input to the input terminal A, the impedance control unit 5 has a signal inputted through an input terminal C0 thereof, outputs an operation control signal to the output impedance units 3 and 8 through output terminals C1 and C3 thereof, and feeds an operation control signal to the impedance variation unit 6 through an output terminal C2 thereof.

Figure 15:
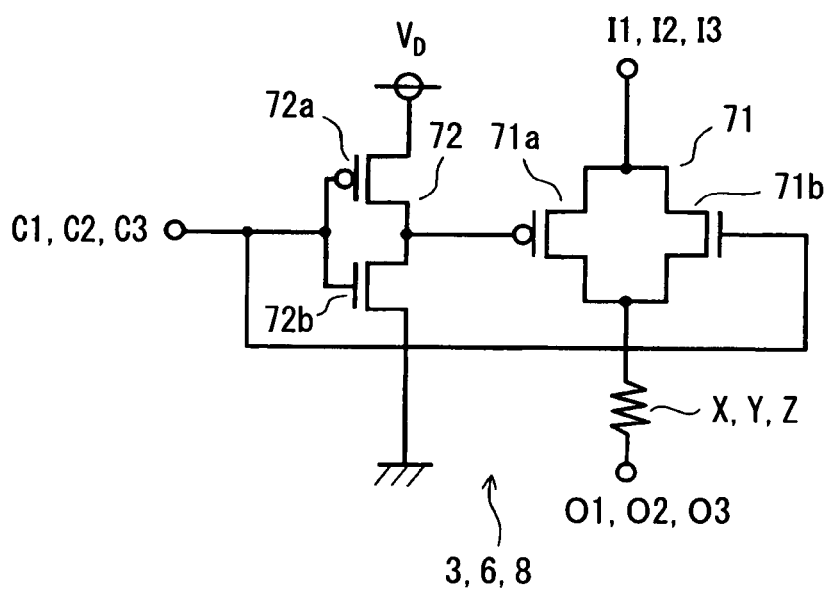
FIG. 15 is a circuit diagram illustrating an exemplary impedance variation unit in accordance with an embodiment.

The output impedance units 3 and 8 and impedance variation unit 6 are each formed with a CMOS circuit, for example as shown in FIG. 15. In the output impedance unit 3, output impedance unit 8, or impedance variation unit 6, an output data signal input from the output buffer circuit 2, output buffer circuit 7, or signal line 4 is inputted through the input terminal I1, I2, or I3, and routed to an output terminal O1, O2, or O3, which is connected to the signal line 4 or 9, via a transfer gate 71 and a resistor X, Y, or Z which serves as an impedance element.

The transfer gate 71 includes a p-channel metal-oxide semiconductor (PMOS) transistor 71a and an n-channel MOS (NMOS) transistor 71b. The output data signal is input to the gate of the PMOS transistor 71a via an inverter circuit 72 through the input terminal C1, C2, or C3 and the output terminal of the impedance control unit 5. The output data signal is input directly to the gate of the NMOS transistor through the input terminal C1, C2, or C3. The inverter circuit 72 includes a PMOS transistor 72a and an NMOS transistor 72b.

In the output impedance unit 3, output impedance unit 8, or impedance variation unit 6, when a low-level signal L, representing, for example, output data of 0, is input through the input terminal C1, C2, or C3, the output of the inverter circuit 72 is at the high level H. Therefore, the transfer gate 71 is retained in an OFF state, and the input terminal I1, I2, or I3 and the output terminal O1, O2, or O3 are disconnected to each other. The impedance is therefore an infinite ∞.

When a high-level signal H, representing, for example, output data of 1, is input through the input terminal C1, C2, or C3, the transfer gate 71 is turned on. Therefore, the input terminal I1, I2, or I3 and the output terminal O1, O2, or O3 conduct. The output terminal O1, O2, or O3 are connected to an output via elements X, Y, or Z, which can be resistors, impedance elements or the like. Accordingly, the impedance or resistance varies along with a change in the output data.

Figure 16:
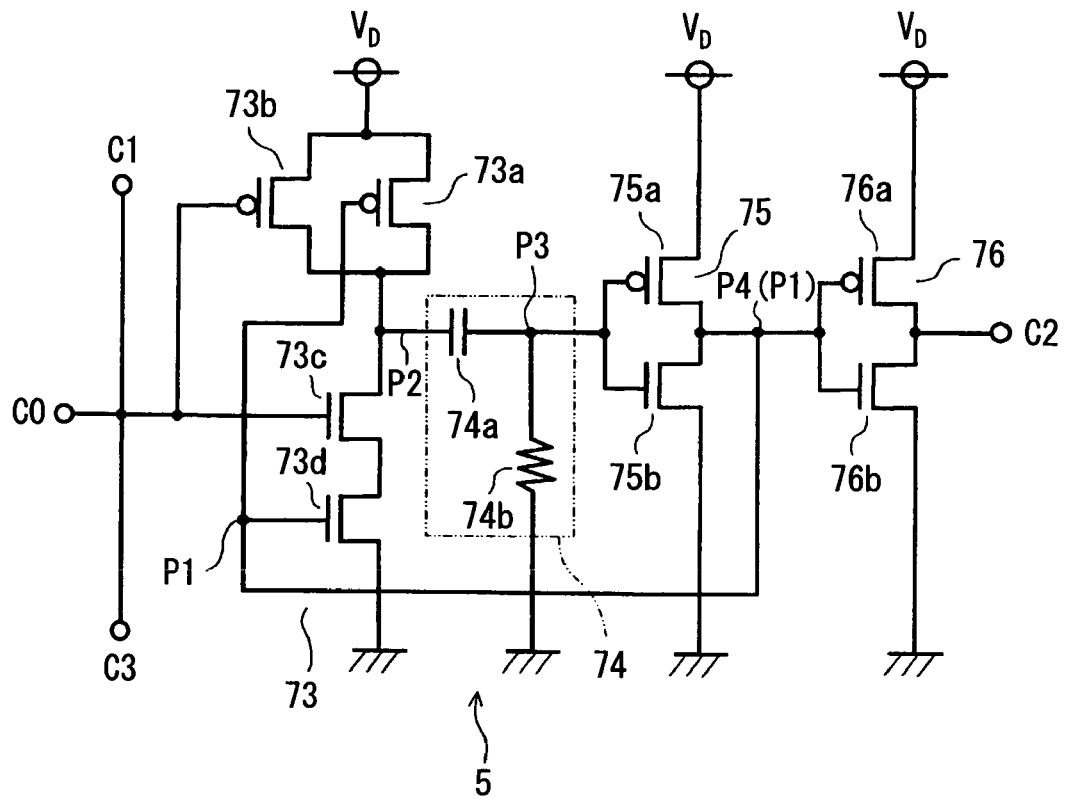
FIG. 16 is a circuit diagram illustrating an exemplary impedance control unit in accordance with an embodiment.

The impedance control unit 5 can be formed as a CMOS circuit, as shown, for example, in FIG. 16. An output data signal input from the output buffer circuit 2 is inputted through the input terminal C0, and outputted through the output terminals C1 and C3, which are connected to the input terminals of the impedance variation units 3 and 8 respectively. The output data signal is also inputted to an NAND circuit 73. The NAND circuit 73 includes two PMOS transistors 73a and 73b and two NMOS transistors 73c and 73d. The input terminal C0 is connected to an input terminal of the NAND circuit 73.

The output terminal of the NAND circuit 73 is connected to the input terminal of an inverter circuit 75 via a time constant circuit 74. The time constant circuit 74 includes a capacitor 74a and a resistor 74b, and has the ability to retain an output signal of a high level H of the NAND circuit 73 at the high level H during a period of a predetermined retention time T The retention time T corresponds to the impedance match period T.

The inverter circuit 75 includes a PMOS transistor 75a and an NMOS transistor 75b. The output terminal at P1 of the inverter circuit 75 is input back to another input terminal of the NAND circuit 73 and input forward at P4 to the input terminal of an inverter circuit 76. The inverter circuit 76 includes a PMOS transistor 76a and an NMOS transistor 76b. The output terminal of the inverter circuit 76 connected to the input terminal C2 of the impedance variation unit 6.

Figures 18, 19:
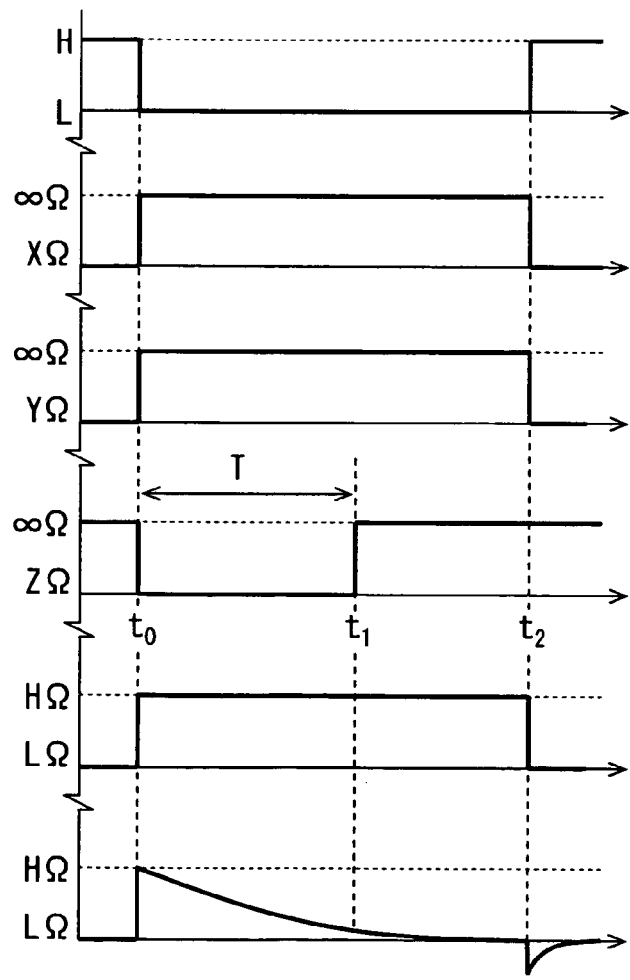
FIG. 18 is a table illustration operational of an exemplary impedance control unit.
FIG. 19 is a timing chart illustrating exemplary timing of signals for controlling states of components.

Next, an operation of the impedance control unit 5 will be described with reference to the equivalent circuit diagram of FIG. 17, the truth table of FIG. 18, and the waveform diagram of FIG. 19. As shown in FIG. 17, the inputs to the NAND circuit 73 are the input C0 and the output P1 of the inverter circuit 75. The output of the NAND circuit 73 at P2 is coupled to a terminal of the capacitor 74a of the time constant circuit 74. The output of the time constant circuit 74, including a terminal of the resistor 74b, is input at P3 to the inverter circuit 75. The output of the inverter circuit 75 is input back to the NAND circuit 73 at P1 and is input forward at P4 to an input of the inverter circuit 76. The output of the inverter circuit 76 is provided at C2.

When output data at the high level H is input to C0 assumes a high level H, the output of the time constant circuit 74 transitions to the low level L regardless of the output of the NAND circuit 73 after a time T elapses. Specifically, the input at P3 of the inverter circuit 75 transitions to the low level. The output P4 of the inverter circuit 75, that is, the other input P1 of the NAND circuit 73 transitions to the high level H. Therefore, the output of the NAND circuit 73 remains stable at the low level L. In the above described state, the output of the inverter circuit 76, that is, the input terminal C2 of the impedance variation unit 6 transitions to the low level L.

When the output data transitions to the high level H, the transfer gate 71 in the impedance variation unit 6 is turned off, and the impedance of the impedance variation unit 6 is an infinite or ∞. When the input terminals C1 and C3 of the output impedance units 3 and 8 respectively assume the high level H, the transfer gates 71 in the output impedance units 3 and 8 respectively are turned on, and the impedances of the output impedance units 3 and 8 respectively are set to the X and Y values respectively.

When the output data transitions to the low level L, the input terminals C1 and C3 of the output impedance units 3 and 8 assume the low level L. The impedances of the output impedance units 3 and 8 become an infinite ∞. In the impedance control unit 5, when one of the inputs of the NAND circuit 73 transitions to the low level L, the output P2 transitions to the high level H. The output P3 of the time constant circuit 74 is temporarily changed to the high level H via the capacitor 74a, and the output of the inverter circuit 75 is temporarily changed to the low level L. Thereafter, charging the capacitor 74a via the resistor 74b proceeds and the output P3 transitions to the low level L. Accordingly, the output of the inverter circuit 75 is changed from the low level L to the high level H. The time required for charging the capacitor 74a is designated as the time during which the output P3 is retained at the low level, that is, as the impedance match period T.

As a result, the impedance of the impedance variation unit 5 is set to the Z value during the impedance match period T after the output data transitions to the low level L. Thereafter, the impedance becomes an infinite ∞.

After the output P4 of the inverter circuit 75 the input P1 of the NAND circuit 73 transitions to the high level H, the other input terminal of the NAND circuit 73 assumes the high level. However, the output P2 of the NAND circuit 73 is not changed during a period during which the output data transitions to the low level L. When the output data transitions to the high level, the output P2 of the NAND circuit 73 transitions to the low level L. The charge in the capacitor 74a is released. The output P3 of the time constant circuit 74 is retained at the low level L.

According to an eighth embodiment as described above, the output impedance units 3 and 8, impedance variation unit 6, and impedance control unit 5 are each formed with a CMOS circuit. The time constant circuit 74 is included for designating the impedance match period T Eventually, the same operation and advantage as those of the aforesaid embodiments can be provided.

Ninth Embodiment

Figure 20:
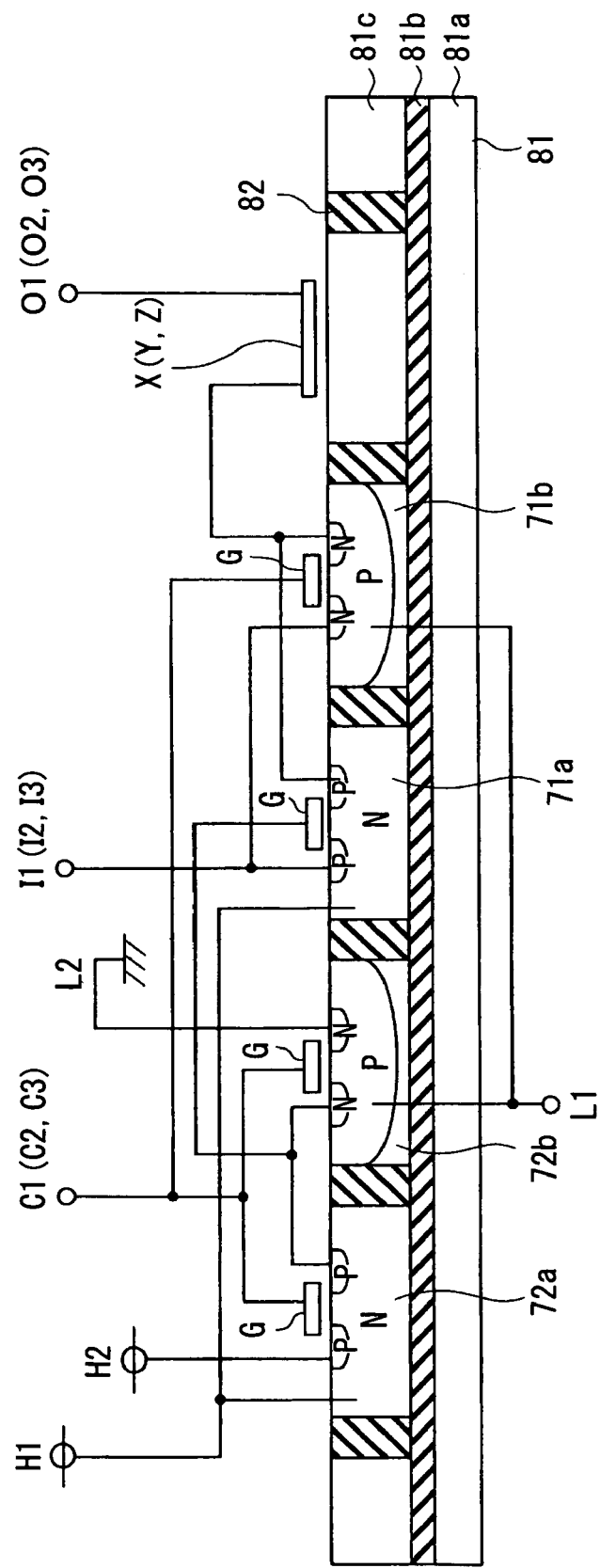
FIG. 20 is a diagram illustrating a sectional view of an exemplary impedance variation unit included in a ninth embodiment.

FIG. 20 shows a ninth embodiment. Although the output impedance units 3 and 8 and impedance variation unit 6, as shown, for example, in FIG. 15, are each formed with a CMOS circuit in an eighth embodiment, the units are integrated into a silicon-on-insulator (SOI) substrate.

FIG. 20 shows an exemplary sectional view of a construction having elements of transistors included in, for example, the output impedance unit 3, separately formed in an SOI substrate 81. The SOI substrate 81 has an n-type monocrystalline silicon film 81c layered on a supporting substrate 81a via an insulating film 81b formed with a silicon oxide film or the like. Grooves are formed in the silicon film 81c in order to define regions in which the respective elements are formed. The silicon oxide film 82 is embedded in the grooves, whereby the elements are separated from one another.

In the regions in which the PMOS transistors 71a and 72a are formed, p-type source and drain regions are formed out of the element formation regions separated from one another, and a gate electrode G is formed via an insulating film. In the regions in which the NMOS transistors 71b and 72b are formed, a p-type well is formed, n-type source and drain regions are formed within the p-type well, and a gate electrode is formed via the insulating film. The resistor X, Y, or Z presenting an impedance is formed with a thin-film resistive body on the insulating film formed on the tops of the element formation regions. These elements are interconnected with a wiring pattern, and formed as the output impedance unit 3 or 8 or the impedance variation unit 6. Power supply terminals H1 and H2 may be set to the same potential, or the power supply terminal H1 may be set to a higher potential. Ground terminals L1 and L2 may be set to the same ground potential, or the ground terminal L2 may be set to the ground potential and the ground terminal L1 may be set to a negative potential.

According to a ninth embodiment, since the SOI substrate 81 is used to form integrated circuit elements, the elements can be reliably isolated or separated from one other in order to form a circuit. The unintended interaction among the elements or other factors such as leakage currents can be suppressed to the greatest possible extent. The circuit can be reliably operated with low power consumption.

In the above described construction, the output impedance units 3 and 8 and impedance variation unit 6 are formed in an integrated circuit using the SOI substrate 81. Alternatively, the entire signal transmission circuit may be formed with a CMOS circuit and fabricated into the SOI substrate 81.

Tenth Embodiment

Figure 21:
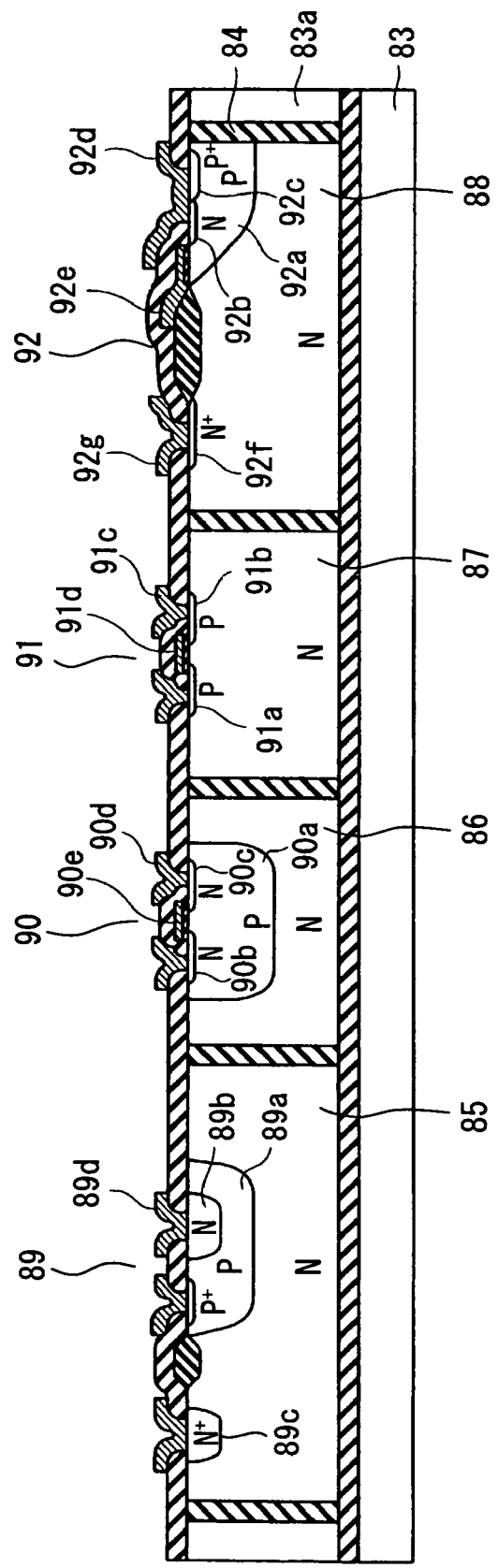
FIG. 21 is a diagram illustrating a sectional view of exemplary circuitry in accordance with a tenth embodiment.

FIG. 21 shows a tenth embodiment. A tenth embodiment differs from a ninth embodiment in that a form of a complex IC including a CMOS circuit is adopted as the circuitry. The complex IC includes, in addition to the foregoing CMOS circuit, a bipolar transistor and a power MOS transistor in a complex manner. The complex IC may further include a resistor and a capacitor as integral parts.

In a construction shown in FIG. 21, trenches are formed in an N-type monocrystalline silicon film 83a on an SOI substrate 83. An insulating film 84 such as a silicon oxide film is embedded in the trenches, whereby multiple element formation regions 85 to 88 are defined. For example, a bipolar transistor 89, an NMOS transistor 90, a PMOS transistor 91, and a power MOSFET 92 are formed in the respective element formation regions 85 to 88.

The bipolar transistor 89 includes the element formation region 85 as a collector region and has a P-type base region 89a formed on the superficial part. An N-type emitter region 89b is formed in the base region 89a. In the element formation region 85, a high-density N-type region is formed as a collector contact region 89c at a position away from the base region 89a. An electrode 89d is formed on each of the base region 89a, emitter region 89b, and collector region 89c.

The NMOS transistor 90 has a P-type well 90a formed in the element formation region 86. A source region 90b and a drain region 90c are formed within the P-type well 90a. An electrode 90d is formed on each of the source region 90b and drain region 90c. A gate electrode 90e is formed on the top of the element formation region 96 with a gate insulating film between them. The PMOS transistor 91 has a source region 91a and a drain region 91b formed in the element formation region 87. An electrode 91c is formed on each of the source region 91a and drain region 91b. A gate electrode 91d is formed on the top of the element formation region 87 with a gate insulating film between them. The NMOS transistor 90 and PMOS transistor 91 constitute a CMOS circuit.

The power MOSFET 92 is formed to have a lateral double diffused (LD) structure. The element formation region 88 is used as a drain region. A P-type channel region 92a is formed through double diffusion, and an N-type source region 92b and a P-type channel contact region 92c are formed within the P-type channel region 92a. A source electrode 92d is formed on the source region 92b and channel contact region 92c. A gate electrode 92e is formed on the top of the channel region 92a with a gate insulation film between them. A high-density N-type region is formed as a drain contact region 92f at a position away from the channel region 92a. An electrode 92g is formed on the drain contact region 92f.

In the foregoing construction, the elements 89 to 92 are formed as the elements of an integrated circuit realizing the output impedance unit 3 or 8, impedance variation unit 6, impedance control unit 5, or output buffer circuit 2 or 7 in a first embodiment, though the wiring among the elements is not shown. A complex IC is formed as a whole.

According to the present embodiment, the SOI substrate 83 is divided into regions with trenches. In addition to a CMOS circuit, a bipolar transistor and a power MOS transistor or a resistor, a capacitor, and a memory element are included in a complex manner in order to construct a one-chip IC having analog processing and digital processing facilities and a power facility implemented therein. Circuit elements suitable for each circuit can be employed, and excellent noise tolerance and excellent surge tolerance can be realized.

Eleventh Embodiment

Figure 22:
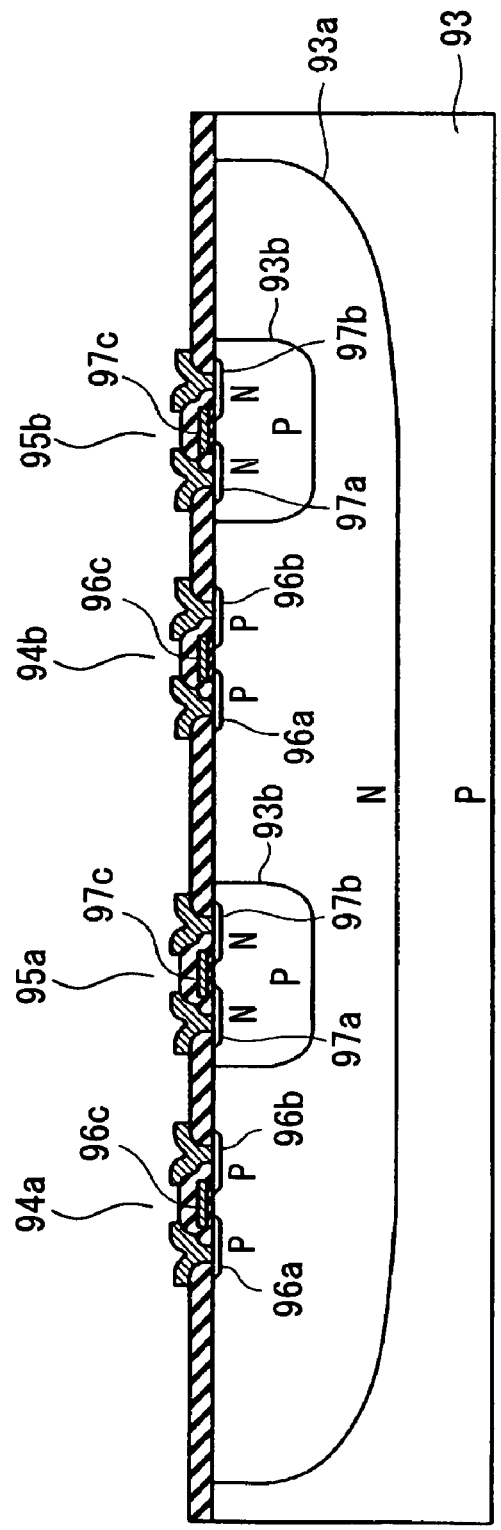
FIG. 22 is a diagram illustrating a sectional view of exemplary circuitry in accordance with an eleventh embodiment.

FIG. 22 shows an eleventh embodiment. An eleventh embodiment differs from a ninth embodiment in that a form of an IC using a normal silicon substrate 93 instead of an SOI substrate is adopted as the circuitry.

An N-type well 93a serving as an element formation region is formed in a P-type silicon substrate 93, and P-type wells 93b are formed within the well 93a in association with NMOS transistors. In the illustrated construction, two PMOS transistors 94a and 94b are formed within the N-type well 93a, and two NMOS transistors 95a and 95b are formed in the respective P-type wells 93b. Each of the PMOS transistors 94a and 94b has a source region 96a, a drain region 96b, and a gate electrode 96c formed. Each of the NMOS transistors 95a and 95b has a source region 97a, a drain region 97b, and a gate electrode 97c formed.

In the above construction, the pair of PMOS transistor 94a and NMOS transistor 95a or the pair of PMOS transistor 94b and NMOS transistor 95b constitutes a CMOS circuit. Other MOS transistors that are not shown are used in combination in in order to form the circuit similar to the aforesaid ones.

In an eleventh embodiment, an integrated circuit can be formed in the same manner as in a tenth embodiment. The circuit can be manufactured according to a general manufacturing process in which an SOI substrate is not used.

Other Embodiments

The present disclosure is not limited to the above described embodiments but can be modified or extended.

For example, the impedance variation unit is not limited to setting the impedance at a terminal of a signal line to a characteristic impedance of the signal line or to a differential impedance between signal lines, but may set the impedance to any other impedance value.

Further, the impedance variation unit may provide an impedance using impedance elements other than the resistor 11 and coil 12, and the elements may be connected with each other in series or parallel or a combination of series and parallel.

Still further, a switching element included in the impedance variation unit and used to switch impedances is not limited to an npn-type bipolar transistor but may be a pnp-type transistor. Otherwise, an FET or any other switching element may be adopted.

Still further, the designation of the impedance match period T can be modified appropriately to any suitable period.

What is claimed is:

1. A signal transmission circuit for applying a signal associated with an output data value of a digital output signal to a signal line, comprising:
    an output buffer circuit that retains the output data value when receiving the digital output signal;
    an output impedance unit that has a first impedance which is an impedance on a side connected to the signal line and which is changed according to the output data value retained in the output buffer circuit;
    an impedance variation unit that has a second impedance with which the signal line is terminated, the second impedance being variable; and
    an impedance control unit that controls the second impedance of the impedance variation unit in such manner that in response to detection of a transition of the output data value from a high level H to a low level L, the second impedance is changed so as to be substantially equal to a characteristic impedance of the signal line only during a predetermined period T.

2. The signal transmission circuit according to claim 1, wherein
    the impedance variation unit includes a switching element and an impedance element, the impedance element having a predetermined impedance, the impedance element connected to the signal line through the switching element.

3. The signal transmission circuit according to claim 1, wherein
    the impedance variation unit includes a transistor connected in series with an impedance element, the impedance element having a predetermined impedance, the impedance element connected to the signal line through the transistor.

4. The signal transmission circuit according to claim 2, wherein
    the impedance element of the impedance variation unit includes a resistive element.

5. The signal transmission circuit according to claim 2, wherein
    the impedance element of the impedance variation unit includes a filter circuit whose impedance and the characteristic impedance of the signal line match each other in a dominant frequency band in which a waveform distortion occurs in a signal transmitted over the signal line.

6. The signal transmission circuit according to claim 1, wherein,
    when the output signal conforms to a controller area network (CAN) protocol, the predetermined period T includes a period from a first time, at which the transition from the high level H to the low level L is detected, to a second time that precedes a sampling point, the period including time required for ensuring a voltage needed for sampling the signal has been preserved.

7. The signal transmission circuit according to claim 1, wherein
    when the output signal conforms to the FlexRay™ protocol, the predetermined period T includes a period determined by subtracting a synchronization error from an idle period within a static slot for the output signal.

8. The signal transmission circuit according to claim 1, wherein:
    the signal line has a plurality of impedance mismatch points in a signal path associated with the signal line; and
    the impedance control unit designates as the predetermined period T, a period from a first time at which the transition from the high level H to the low level L is detected, to a second time at which a reflected wave is returned from a principal one of the plurality of impedance mismatch points.

9. The signal transmission circuit according to claim 1, wherein
    one of the output impedance unit and the impedance variation unit includes a CMOS circuit.

10. The signal transmission circuit according to claim 1, wherein
    one or more of the output buffer circuit, the output impedance unit, the impedance variation unit, and the impedance control unit are integrally formed in a one-chip semiconductor substrate.

11. The signal transmission circuit according to claim 10, wherein
    the semiconductor substrate includes a silicon-on-insulator (SOI) substrate.

12. The signal transmission circuit according to claim 11, wherein
    the output buffer circuit, the output impedance unit, the impedance variation unit, and the impedance control unit are formed as a complex integrated circuit (IC) including a bipolar transistor, a power MOS transistor, a CMOS circuit, a resistor, a capacitor, and a memory element coexist as components of the complex IC.

13. The signal transmission circuit according to claim 1, wherein:
    the first impedance of the output impedance unit has a high impedance value during the low level L of the output data value and has a low impedance value lower than the high impedance value during the high level H of the output data value; and
    in response to the detection of the transition of the output data value from the high level H to the low level L, the impedance control unit discontinuously changes the second impedance of the impedance variation unit, thereby matching the second impedance to the characteristic impedance of the signal line for the predetermined period T only.

14. A signal transmission circuit for applying a signal associated with an output data value of a digital output signal to first and second signal lines, comprising:

first and second output buffer circuits that retain the output data value when receiving the digital output signal;

first and second output impedance units that have respective first and second impedances which are impedances on respective first and second sides connected respectively to the first and second signal lines, and which are changed according to the output data value retained by the first and second output buffer circuits;

an impedance variation unit that has a third impedance with which the first and second signal lines are terminated, the third impedance being variable; and an impedance control unit that controls the third impedance of the impedance variation unit in such manner that in response to detection of a transition of the output data value from a high level H to a low level L, the third impedance is changed so as to be substantially equal to a differential impedance between the first and second signal lines only during a predetermined period T.

15. The signal transmission circuit according to claim 14, wherein
the impedance variation unit includes a switching element and an impedance element, the impedance element having a predetermined impedance, and being connected between the first and second signal lines through the switching element.

16. The signal transmission circuit according to claim 14, wherein
the impedance variation unit includes a transistor connected in series with an impedance element, the impedance element having a predetermined impedance and being connected between the first and second signal lines through the transistor.

17. The signal transmission circuit according to claim 15, wherein the impedance element of the impedance variation unit includes a resistive element.

18. The signal transmission circuit according to claim 15, wherein the impedance element of the impedance variation unit includes a filter circuit whose impedance and the differential impedance between the first and second signal lines match each other in a dominant frequency band in which a waveform distortion occurs in a signal transmitted over the first and second signal lines.

19. The signal transmission circuit according to claim 14, wherein,
when the output signal conforms to a controller area network (CAN) protocol, the predetermined period T includes a period from a first time, at which the transition from the high level H to the low level L is detected, to a second time that precedes a sampling point, the period including time required for ensuring a voltage needed for sampling the signal has been preserved.

20. The signal transmission circuit according to claim 14, wherein,
when the output signal conforms to the FlexRay™ protocol, the predetermined period T includes a period determined by subtracting a synchronization error from an idle period within a static slot for the output signal.

21. The signal transmission circuit according to claim 14, wherein:
a signal path associated with the first and second signal lines has a plurality of impedance mismatch points; and
the impedance control unit designates as the predetermined period T, a period from a first time at which the transition from the high level H to the low level L is detected, to a second time at which a reflected wave is returned from a principal one of the plurality of impedance mismatch points.

22. The signal transmission circuit according to claim 14, wherein
one of the first and second output impedance units and the impedance variation unit includes a CMOS circuit.

23. The signal transmission circuit according to claim 14, wherein
one or more of the first and second output buffer circuits, the first and second output impedance units, the impedance variation unit, and the impedance control unit are integrally formed in a one-chip semiconductor substrate.

24. The signal transmission circuit according to claim 23, wherein
the semiconductor substrate includes a silicon-on-insulator (SOI) substrate.

25. The signal transmission circuit according to claim 24, wherein
the output buffer circuit, the output impedance unit, the impedance variation unit, and the impedance control unit are formed as a complex integrated circuit (IC) including a bipolar transistor, a power MOS transistor, a CMOS circuit, a resistor, a capacitor, and a memory element coexist as components of the complex IC.

26. The signal transmission circuit according to claim 14, wherein:
each of the first and second impedances of the first and second output impedance unit has a high impedance value during the low level L of the output data value and has a low impedance value lower than the high impedance value during the high level H of the output data value; and
in response to the detection of the transition of the output data value from the high level H to the low level L, the impedance control unit discontinuously changes the third impedance of the impedance variation unit, thereby matching the third impedance to the characteristic impedance of the signal line for the predetermined period T only.

* * * * *